United States Patent
Liu et al.

(10) Patent No.: US 11,854,143 B2
(45) Date of Patent: Dec. 26, 2023

(54) LIGHT PROBE GENERATION METHOD AND APPARATUS, STORAGE MEDIUM, AND COMPUTER DEVICE

(71) Applicant: TENCENT TECHNOLOGY (SHENZHEN) COMPANY LIMITED, Guangdong (CN)

(72) Inventors: Dian Liu, Shenzhen (CN); Yu Cheng Qu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 267 days.

(21) Appl. No.: 17/500,437

(22) Filed: Oct. 13, 2021

(65) Prior Publication Data

US 2022/0036643 A1    Feb. 3, 2022

Related U.S. Application Data

(63) Continuation of application No. PCT/CN2020/117565, filed on Sep. 25, 2020.

(30) Foreign Application Priority Data

Dec. 5, 2019   (CN) .......................... 201911236004.9

(51) Int. Cl.
  *G06T 15/50*   (2011.01)
  *G06T 15/60*   (2006.01)

(52) U.S. Cl.
  CPC .......... *G06T 15/506* (2013.01); *G06T 15/60* (2013.01); *G06T 2210/12* (2013.01); *G06T 2210/21* (2013.01)

(58) Field of Classification Search
  CPC ... G06T 15/506; G06T 15/60; G06T 2210/12; G06T 2210/21
  See application file for complete search history.

(56) References Cited

U.S. PATENT DOCUMENTS

| 10,258,884 B2 | 4/2019 | Lemer |
| 2014/0327690 A1 | 11/2014 | McGuire et al. |
| 2016/0260247 A1 | 9/2016 | Fursund et al. |

FOREIGN PATENT DOCUMENTS

| CN | 1547163 A | 11/2004 |
| CN | 101836235 A | 9/2010 |
| CN | 106204701 A | 12/2016 |

(Continued)

OTHER PUBLICATIONS

Wyman, Chris. "Voxelized shadow volumes." Proceedings of the ACM SIGGRAPH Symposium on High Performance Graphics. 2011. (Year: 2011).*

(Continued)

*Primary Examiner* — Daniel F Hajnik
(74) *Attorney, Agent, or Firm* — Sughrue Mion, PLLC (57) ABSTRACT

A light probe generation method and apparatus, a storage medium, and a computer device are provided. The method includes: selecting shadow points of a target object in a virtual scene; converting the selected shadow points into a voxelized shadow voxel object; reducing a quantity of vertexes in the shadow voxel object to obtain a shadow voxel object after the reduction; and generating a light probe at a vertex position of the shadow voxel object after the vertex reduction.

20 Claims, 9 Drawing Sheets

(56) References Cited

FOREIGN PATENT DOCUMENTS

| CN | 106215419 A | 12/2016 |
|---|---|---|
| CN | 109364481 A | 2/2019 |
| CN | 110335354 A | 10/2019 |
| CN | 110522501 A | 12/2019 |
| CN | 110992466 A | 4/2020 |

OTHER PUBLICATIONS

Wyman, Chris, and Zeng Dai. "Imperfect voxelized shadow volumes." Proceedings of the 5th High-Performance Graphics Conference. 2013. (Year: 2013).*

Sintorn, Erik, et al. "Compact precomputed voxelized shadows." ACM Transactions on Graphics (TOG) 33.4 (2014): 1-8. (Year: 2014).*

International Search Report for PCT/CN2020/117565 dated Dec. 23, 2020 [PCT/ISA/210].

Written Opinion for PCT/CN2020/117565 dated Dec. 23, 2020 [PCT/ISA/237].

Chinese Office Action of 2019112360049 dated Feb. 10, 2021.

Communication dated Feb. 17, 2023 from the Korean Patent Office in Application No. 10-2022-7001755.

Yue Wang et al., "Fast non-uniform Radiance Probe Placement and Tracing", I3D'19, May 21-23, 2019, Montreal, QC, Canada (9 pages total).

Zander Majercik et al., "Dynamic Diffuse Global Illumination with Ray-Traced Irradiance Fields", Journal of Computer Graphics Techniques, 2019, vol. 8, No. 2 (30 pages total).

Extended European Search Report dated Dec. 6, 2022 in European Application No. 20895977.5.

"Unity—Manual: Light Probes", 2019, Retrieved from: https://docs.unity3d.com/2019.1/Documentation/Manual/LightProbes.html, Version 2019.1 (27 pages total).

Gene Greger et al., "The Irradiance Volume", IEEE Computer Graphics and Applications, 1998, vol. 18, No. 2, pp. 32-43 (12 pages total).

* cited by examiner

LIGHT PROBE GENERATION METHOD AND APPARATUS, STORAGE MEDIUM, AND COMPUTER DEVICE

CROSS-REFERENCE TO RELATED APPLICATION(S)

This application is a continuation application of International Application No. PCT/CN2020/117565, filed Sep. 25, 2020, which claims priority to Chinese Patent Application No. 2019112360049, filed with the National Intellectual Property Administration, PRC on Dec. 5, 2019, the disclosures of which are incorporated by reference in their entireties.

FIELD

The disclosure relates to the field of image rendering technologies, and in particular, to a light probe generation method and apparatus, a storage medium, and a computer device.

BACKGROUND

Light probe is a light rendering technology that may be used to collect light information received from all directions around, and then apply the light information to a rendered object, to affect a final light effect of the rendered object.

A plurality of light probes are generally evenly distributed according to a lattice corresponding to a virtual scene, and this distribution manner consumes a large amount of memory and distribution time.

SUMMARY

Embodiments of the disclosure provide a light probe generation method and apparatus, a storage medium, and a computer device.

A light probe generation method is provided, performed by a computer device, the method including:
selecting shadow points of a target object in a virtual scene;
converting the selected shadow points into a voxelized shadow voxel object;
reducing a quantity of vertexes in the shadow voxel object to obtain a shadow voxel object after the reduction; and
generating a light probe at a vertex position of the shadow voxel object after the vertex reduction.

A light probe generation apparatus is provided, including:
a selection module, configured to select shadow points of a target object in a virtual scene;
a conversion module, configured to convert the selected shadow points into a voxelized shadow voxel object;
a reduction module, configured to reduce a quantity of vertexes in the shadow voxel object to obtain a shadow voxel object after the reduction; and
a generation module, configured to generate a light probe at a vertex position of the shadow voxel object after the vertex reduction.

A computer-readable storage medium stores a computer program, the computer program, when executed by a processor, causing the processor to perform the following operations:
selecting shadow points of a target object in a virtual scene;
converting the selected shadow points into a voxelized shadow voxel object;
reducing a quantity of vertexes in the shadow voxel object to obtain a shadow voxel object after the reduction; and
generating a light probe at a vertex position of the shadow voxel object after the vertex reduction.

A computer device is provided, including a memory and a processor, the memory storing a computer program, and the computer program, when executed by the processor, causing the processor to perform the following operations:
selecting shadow points of a target object in a virtual scene;
converting the selected shadow points into a voxelized shadow voxel object;
reducing a quantity of vertexes in the shadow voxel object to obtain a shadow voxel object after the reduction; and
generating a light probe at a vertex position of the shadow voxel object after the vertex reduction.

Details of one or more embodiments of the disclosure are provided in the drawings and descriptions below. Other features and advantages of the disclosure become apparent with reference to the specification, the accompanying drawings, and the claims.

BRIEF DESCRIPTION OF THE DRAWINGS

To describe the technical solutions in the example embodiments of the disclosure more clearly, the following briefly introduces the accompanying drawings required for describing the embodiments. The accompanying drawings in the following description show only some embodiments of the disclosure, and a person of ordinary skill in the art may still derive other accompanying drawings from these accompanying drawings without creative efforts.

DETAILED DESCRIPTION

To make objectives, technical solutions, and advantages of the disclosure clearer and more comprehensible, the disclosure is further elaborated in detail with reference to the accompanying drawings and embodiments. It is to be understood that the specific embodiments described herein are merely used for explaining the disclosure but are not intended to limit the disclosure.

Figure 1:
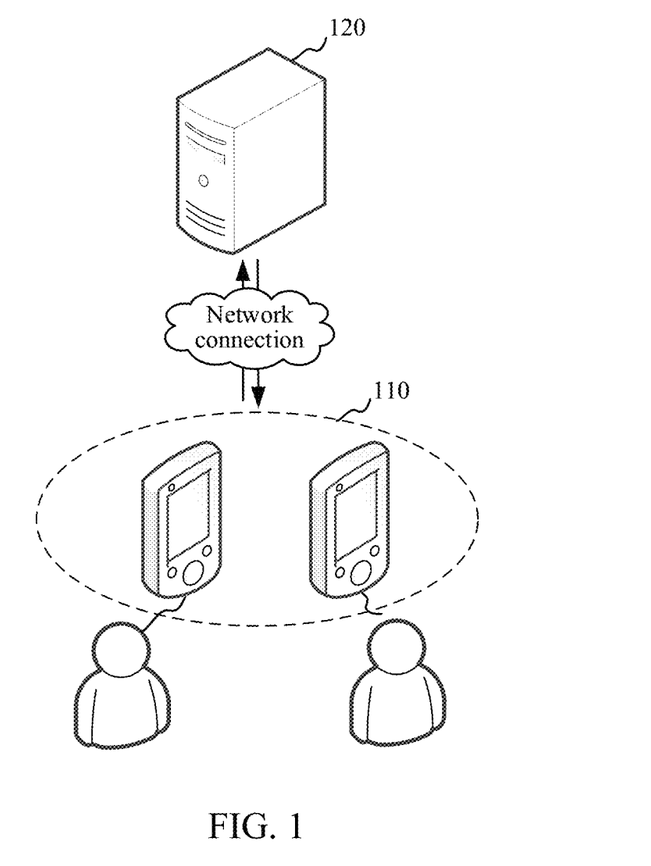
FIG. 1 is a diagram of an application environment of a light probe generation method according to an embodiment.

FIG. 1 is a diagram of an application environment of a light probe generation method according to an embodiment. Referring to FIG. 1, the light probe generation method is applied to a light probe generation system. The light probe generation system includes a terminal 110 and a server 120. The terminal 110 and the server 120 are connected by using a network. The terminal 110 selects shadow points of a target object in a virtual scene; converts the selected shadow points into a voxelized shadow voxel object; reduces a quantity of vertexes in the shadow voxel object to obtain a shadow voxel object after the reduction; and generates a light probe at a vertex position of the shadow voxel object after the vertex reduction.

The terminal 110 may be specifically a desktop terminal or a mobile terminal. The mobile terminal may be specifically at least one of a mobile phone, a tablet computer, a notebook computer, and the like. The server 120 may be implemented by using an independent server or a server cluster that includes a plurality of servers.

Figure 2:
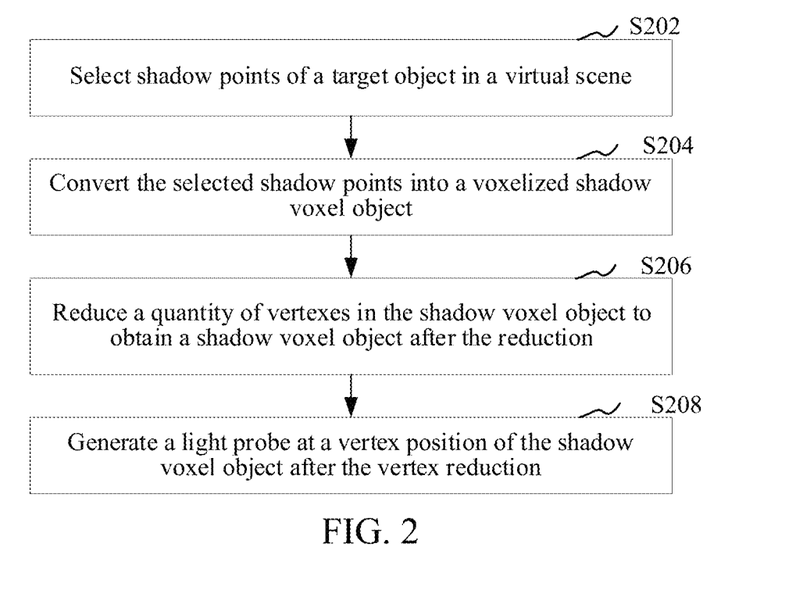
FIG. 2 is a schematic flowchart of a light probe generation method according to an embodiment.

As shown in FIG. 2, in an embodiment, a light probe generation method is provided. The method may be performed by the terminal or the server shown in FIG. 1, or may be performed by the terminal and the server collaboratively. In this embodiment, the method being applied to the terminal 110 in FIG. 1 is mainly used as an example for description. Referring to FIG. 2, the light probe generation method specifically includes the following operations S202-S208:

S202: Select shadow points of a target object in a virtual scene.

A virtual scene refers to a virtual scene environment generated by using a computer, which can provide a multimedia virtual world, and a user may control an operable virtual object in the virtual scene through an operating device or an operation interface, to observe objects, animals, characters, sceneries, and other virtual things in the virtual scene from a viewing angle of the virtual object, or interact with the objects, animals, characters, sceneries, and other virtual things or other virtual objects in the virtual scene through the virtual object. The virtual scene is generally generated by an application in a computer device such as a terminal and displayed based on hardware (for example, a screen) in the terminal.

A target object may be a virtual thing (or virtual object) such as an object, an animal, a character, or a scenery with ground features in a virtual scene. The object may be a building, a tree, or the like in a virtual scene. The character may be a character role in a virtual scene. The animal may be a pet or a monster in a virtual scene. The scenery may be a mountain in a virtual scene with certain landforms and objects.

The shadow points: when a light source projects a light ray into the target object, a shadow region is formed at a side of the target object opposite to the light source, and points in the entire shadow region are the shadow points.

In an embodiment, the terminal starts a first development engine, and calculates a bounding box of the virtual scene in the first development engine. S202 may specifically include: generating, by the terminal, a lattice in the bounding box of the virtual scene; and determining, when a light source projects a light ray from the bounding box to the virtual scene, that the light ray is intersected with points in the lattice and the light ray is intersected with the target object, and using the intersected points as the shadow points of the target object for extraction. The light ray may be an illumination ray emitted by the light source, used for representing a path and a direction of the illumination.

In an embodiment, the terminal creates a virtual light source by using the first development engine, and simulates the illumination by using the light source, that is, projects a corresponding light ray into the virtual scene.

Figure 3:
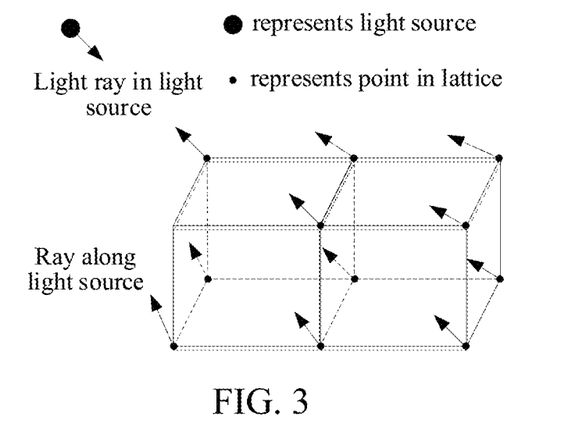
FIG. 3 is a schematic diagram of emitting a ray in an opposite direction of a light source by using points in a lattice as reference points according to an embodiment.

For example, the terminal starts a Unity engine, calculates a bounding box of the virtual scene in the Unity engine, and generates evenly distributed lattice in the bounding box. Small black points shown in FIG. 3 are the lattice evenly distributed in the bounding box. In the bounding box, the terminal creates a light source (for example, a big black point shown in FIG. 3) by using the Unity engine, and projects a light ray into the virtual scene through the light source. When a light ray is intersected with both points in the lattice and the target object, that is, there are intersection points between the light ray and the points in the lattice and between the light ray and the target object. In this case, the foregoing intersection points are used as the shadow points of the target object.

In an embodiment, the operation of selecting shadow points of a target object may further include: emitting, by the terminal and when the light source projects the light ray from the bounding box to the virtual scene, a ray in a direction of the light source by using the points in the lattice as reference points; and using, when the ray is intersected with all the target points in the target object, the target points and the corresponding reference points as the shadow points of the target object for extraction.

Using points in the lattice as reference points, and a ray that is emitted in a direction of a light source, that is, as shown in FIG. 3, small black points in FIG. 3 are used as starting points, and a ray is emitted in a direction of a big black point. When the ray is intersected with a target object (the target object is not shown in FIG. 3), the intersection point and a corresponding black point (that is, a point in the lattice) are remarked as shadow points, and similarly, all shadow points are found, and then all the shadow points are selected from the lattice.

Figure 4:
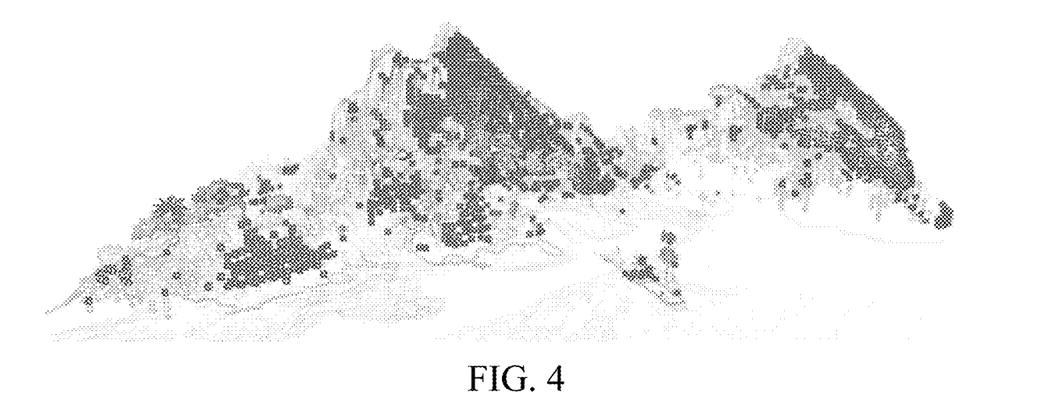
FIG. 4 is a schematic diagram of determining a shadow point in a virtual scene according to an embodiment.

In another example, as shown in FIG. 4, a lattice evenly distributed in the bounding box of the virtual scene are generated, and points in a shadow of a mountain are calculated by using ray projection.

In an embodiment, after extracting all the shadow points of the target object, the terminal stores the shadow points to a lattice information file, and then exports the lattice information file from the first development engine. For example, the shadow points are saved in a file with the suffix of ".ply", and ".ply" is a file format that only saves position information.

S204: Convert the selected shadow points into a voxelized shadow voxel object.

The voxel is short for a volume pixel, which is similar to a pixel in two dimensions, and is a space with a unit length in three dimensions. The voxel may be represented by 3D rendering or extracting a polygon isosurface with a given threshold contour. The voxelization may refer to a process of simplifying reducing irregular 3D objects to unit mesh voxels. A shadow voxel object of the voxelization is a voxel object of converting the selected shadow points into unit mesh voxels. The voxel object not only may include surface information of the shadow points, but also may describe an internal attribute of the shadow points.

In an embodiment, when the light source projects the light ray from the bounding box to the virtual scene, the terminal determines a shadow region formed by a virtual object in the light ray; and generates a polyhedron enclosing the shadow region. S204 may specifically include: converting, by the terminal, the polyhedron enclosing the shadow region into a voxelized shadow voxel object.

In an embodiment, when a light ray is projected from the bounding box to the virtual scene, the light ray is projected from an edge of the target object. In this case, the terminal determines a first intersection point of the light ray and the edge of the target object, and a second intersection point between the light ray and another obstacle that blocks the light ray, and connects the first intersection point to the second intersection point to obtain an intersection line. In this case, a region between a backlighting region of the target object and the intersection line corresponds to the shadow region.

Figure 5:
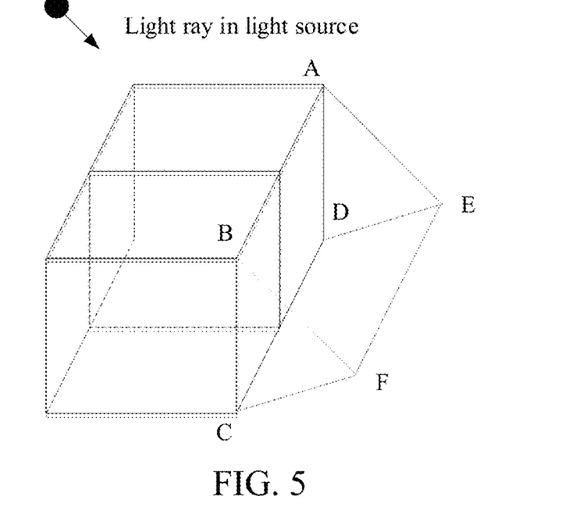
FIG. 5 is a schematic diagram of a shadow generated when a light source illuminates a target object according to an embodiment.

For example, a shadow voxel object enclosing the selected shadow points is obtained by using a shadow volume manner, that is, a shadow region of the target object is generated under the projection of the light source, and a corresponding polyhedron is directly generated according to the shadow region, the polyhedron enclosing the entire shadow region of the target objects; and then the polyhedron is voxelized to obtain the shadow voxel object. As shown in FIG. 5, it is assumed that the cube is a target object, and when the light source is illuminated on the target object, a 3D shadow region ABCDEF is formed. A corresponding polyhedron is generated according to the 3D shadow region ABCDEF, and then the polyhedron is voxelized to obtain the shadow voxel object.

In an embodiment, the terminal imports a lattice information file saving the shadow points into a second development engine, and converts the shadow points into a voxelized shadow voxel object by using the second development engine.

In an embodiment, S204 may specifically include: obtaining, by the terminal, a first polyhedron; copying (or applying) the first polyhedron to the shadow points by using the second development engine, to obtain a corresponding shadow volume; and then voxelizing the shadow volume to obtain a shadow voxel object. The first polyhedron may be a tetrahedron or a cube, or some other polyhedrons. The first polyhedron may have a preset size and/or shape. Volume of each first polyhedron is relatively small.

Figure 6:
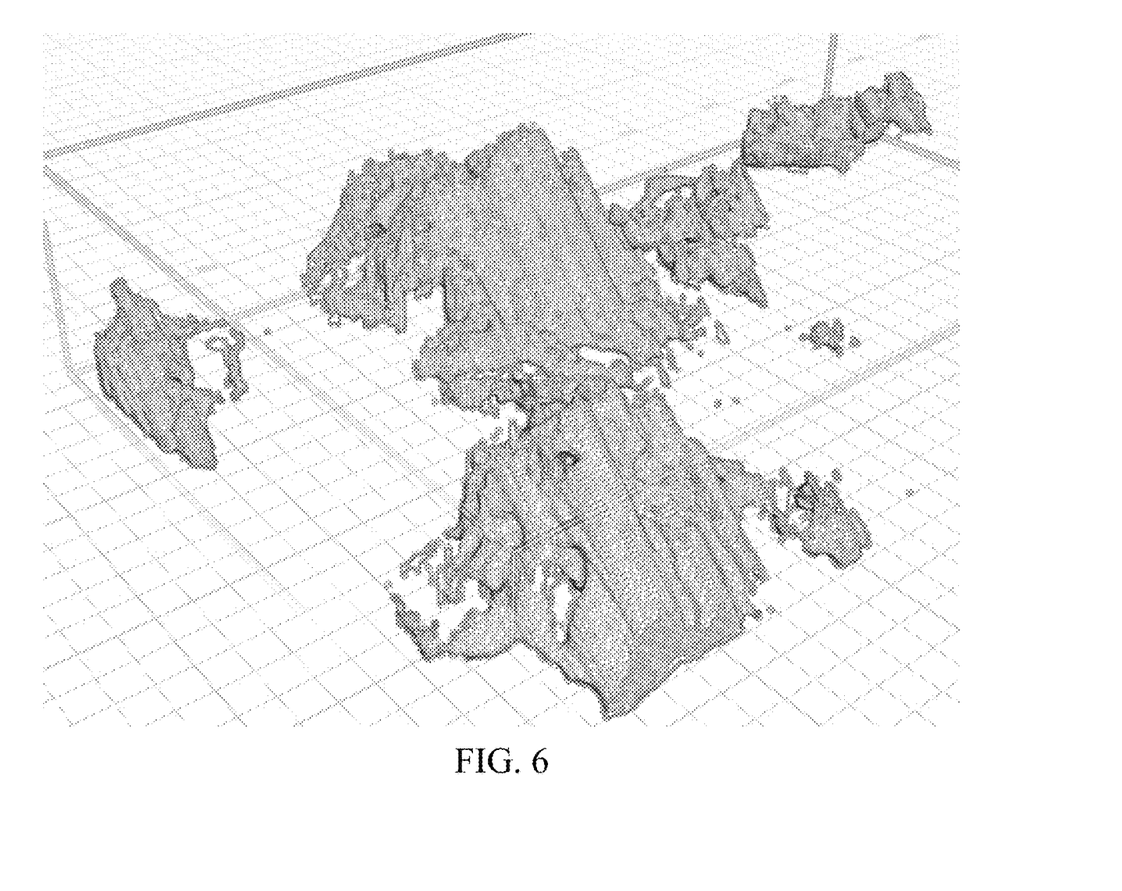
FIG. 6 is a schematic diagram of a shadow voxel object according to an embodiment.

For example, the terminal copies tetrahedrons to the shadow points by using CopyTo nodes in a Houdini engine, and in this case, a shadow volume is obtained. Faces of the tetrahedrons that make up the shadow volume are interspersed with each other and with a large quantity. In this case, the terminal needs to voxelize the entire shadow volume. As shown in FIG. 6, a shadow voxel object obtained after the voxelization is a hollow bag-like model.

In another embodiment, S204 may specifically include: generating, by the terminal, a second polyhedron configured to enclose the selected shadow points; and performing voxelization on the second polyhedron to obtain the shadow voxel object.

The second polyhedron may be a polyhedron fitting closely to a contour of the shadow points, and the contour of the shadow points fits to an inner surface of the second polyhedron.

In an embodiment, the terminal determines drawn paths at an inner surface and an outer surface of the shadow points, and draws polygons at the inner surface and the outer surface according to the paths. The polygons are connected to each other to form a thin film of polygonal mesh enclosing the selected shadow points at the inner surface or the outer surface respectively, and the two thin films of polygonal mesh are the second polyhedron.

S206: Reduce a quantity of vertexes in the shadow voxel object to obtain a shadow voxel object after the reduction.

The shadow voxel object is obtained after the shadow volume is voxelized, and the shadow volume is formed by polyhedrons. Therefore, a quantity of vertexes and planes of the shadow voxel object is relatively large, and the quantity of vertexes and planes needs to be reduced. Then, light probes are generated at a vertex position of the shadow voxel object to reduce a quantity of the light probes.

In an embodiment, S206: Combine, by the terminal, at least two adjacent vertexes in the shadow voxel object; and/or smooth at least two adjacent planes in the shadow voxel object to reduce the quantity of the vertexes in the shadow voxel object.

Figure 7:
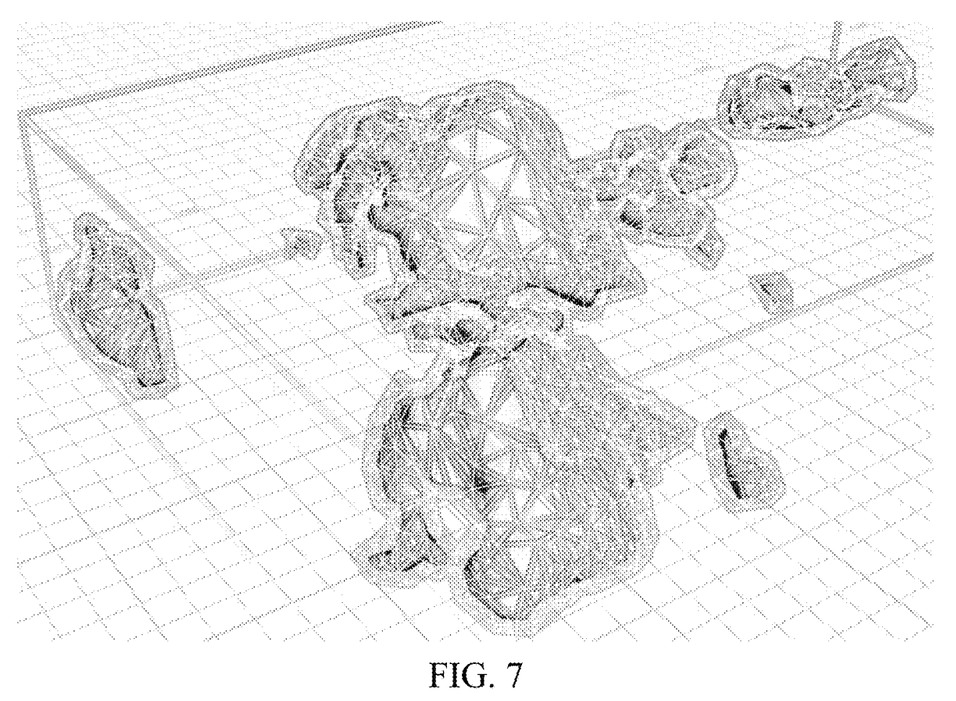
FIG. 7 is a schematic diagram obtained after performing reduction and smoothing on a quantity of vertexes of a shadow voxel object according to an embodiment.

Specifically, the terminal combines at least two adjacent vertexes of adjacent polyhedrons in the shadow voxel object, to reduce both a quantity of vertexes of the shadow voxel object and a quantity of planes of the shadow voxel object. Additionally or alternatively, as shown in FIG. 7, the terminal smooths at least two adjacent planes of adjacent polyhedrons in the shadow voxel object to make the at least two planes become a hook surface, to reduce the quantity of the vertexes in the shadow voxel object.

S208: Generate a light probe at a vertex position of the shadow voxel object after the vertex reduction.

In an embodiment, S208 may specifically include: internally shrinking, by the terminal, the shadow voxel object after the vertex reduction to obtain an internally-shrunk shadow voxel object; and generating a light probe in the shadow at a vertex position of the internally-shrunk shadow voxel object.

In an embodiment, the terminal determines a shrinking proportion of the shadow voxel object, and reduces the shadow voxel object according to the shrinking proportion to obtain an internally-shrunk shadow voxel object. The internally-shrunk shadow voxel object fits to an inner surface of the shadow points of the target object.

In another embodiment, S208 may specifically include: externally expanding, the shadow voxel object after the vertex reduction to obtain an externally-expanded shadow voxel object; and generating a light probe outside the shadow at a vertex position of the externally-expanded shadow voxel object.

In an embodiment, the terminal determines an externally-expansion proportion of the shadow voxel object, and expands the shadow voxel object according to the externally-expansion proportion to obtain an externally-expanded shadow voxel object. The externally-expanded shadow voxel object fits to an outer surface of the shadow points of the target object. The internally-shrunk shadow voxel object and the externally-expanded shadow voxel object are used as two films, and the shadow points of the target object are enclosed. vertex positions of the two films are positions of light probes inside and outside the shadow. Light probes are generated at the positions, such as connection lines of shadow voxel object surfaces shown in FIG. 7.

In an embodiment, the target object includes a dynamic object. After S208, the method further includes: determining, by the terminal, a position of the dynamic object in a movement process; obtaining light information corresponding to the light probe according to the position; and rendering the dynamic object according to the light information to obtain an animation effect of global light.

The dynamic object may be, for example, a character or an animal in a virtual scene. The character may be a character role in a virtual scene. The animal may be a pet or a monster in a virtual scene.

In an embodiment, the terminal renders the illumination on the dynamic object by using spherical harmonics according to the light information to obtain an animation effect of global light of the dynamic object.

In an embodiment, the target object includes a static object. After S208, the method further includes: determining, by the terminal, a position of the static object; obtaining light information corresponding to the light probe according to a position of the static object; and rendering the static object according to the light information to obtain an animation effect of global light.

In the foregoing embodiment, shadow points of a target object in a virtual scene are selected, the selected shadow points are converted into a voxelized shadow voxel object; a quantity of vertexes in the shadow voxel object are reduced; and light probes are generated at vertex positions of the shadow voxel object after the vertex reduction. Therefore, the need to evenly distribute light probes in all regions in the virtual scene may be avoided, and it is only required to distribute light probes for the target object, which reduces a quantity of distributed light probes. In addition, distribution positions of the light probes are determined by using vertexes of the shadow voxel object. Because the shadow voxel object may be formed by reducing vertexes of a plurality of regular polyhedrons, when the light probes are distributed at vertex positions of the shadow voxel object after the vertex reduction, the light probes may be distributed relatively evenly, avoiding a problem of inconsistent density. Moreover, before the light probes are generated, a quantity of light probes are further reduced by reducing a quantity of vertexes in the shadow voxel object.

Figure 8:
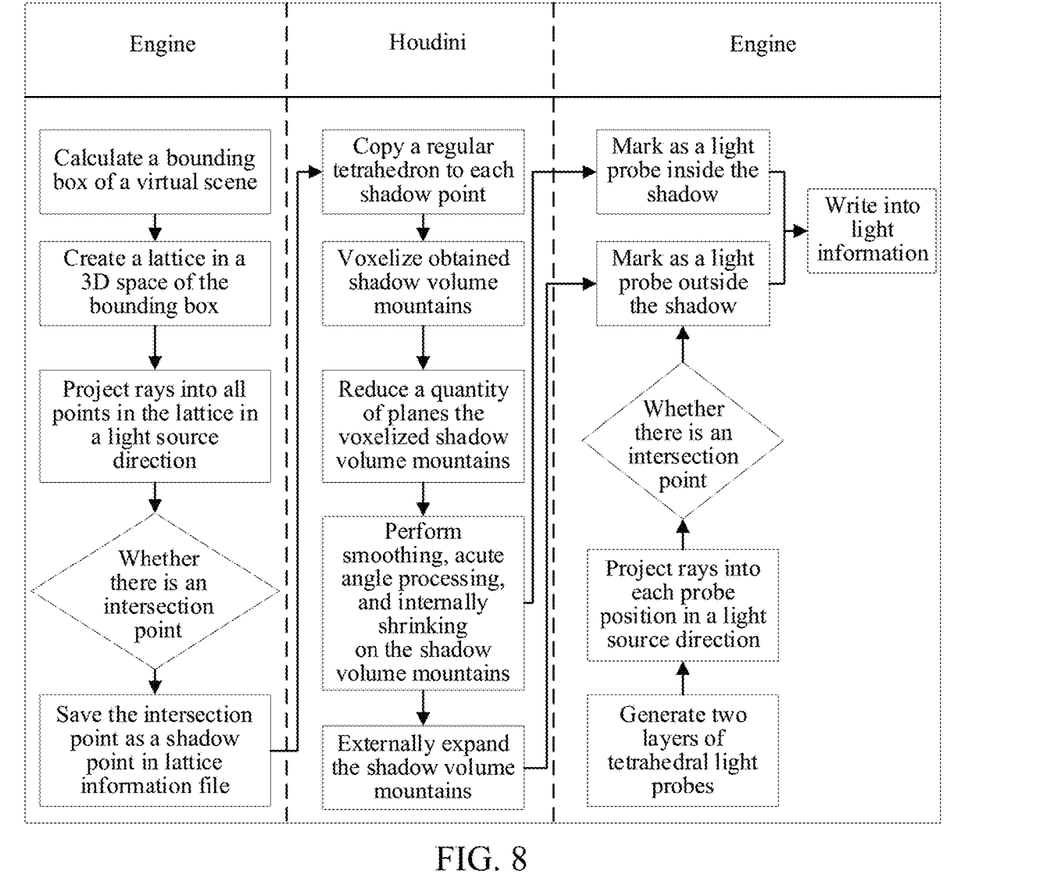
FIG. 8 is a schematic flowchart of a light probe generation method according to another embodiment.

In an example, operations for generating a light probe in this embodiment may be divided into the following three stages: Unity engine→Houdini→Unity engine. As shown in FIG. 8, specific content is shown in the following:

1. First stage: in a Unity engine, a bounding box of a virtual scene is calculated, and an evenly distributed lattice (as shown in FIG. 3) is generated in the bounding box. When a light source projects a light ray in the bounding box, for each point in the lattice, a ray is emitted in an opposite direction of the light source by using the point in the lattice as a reference point. Then whether the ray is intersected with a target object in the virtual scene is determined. If there is an intersection point, a corresponding point in the lattice is marked as a shadow point, and the above process is repeated until all shadow points of all the target objects are found. Then, all these shadow points are saved in a file. For example, the shadow points are saved with the suffix of ".ply" (".ply" is a file format that may only save position information).

2. Second stage: the .ply file is imported into Houdini, and then tetrahedrons are copied to each shadow point by using CopyTo nodes, to form a "mountain of shadow volume", that is, a shadow volume. Because faces of these tetrahedrons that forms the shadow volume are interspersed with each other and with a large quantity, it needs to be simplified. The simplification may be done by voxelizing the entire shadow volume, and the shadow volume (that is, an obtained shadow voxel object) after voxelization becomes a hollow bag-like model. Then, the faces of the hollow bag-like model are reduced automatically, to obtain a shadow voxel object after the face reduction. Then the shadow voxel object is internally shrunk to obtain a film closely attached to a shadow inside of the target object. Therefore, a shadow inside of the target object is outlined by using a shadow voxel object. Then, the shadow voxel object is externally expanded to obtain a film closely attached to a shadow inside of the target object. Therefore, a shadow outside of the target object is outlined by using a shadow voxel object. Vertex positions of the two films of the shadow inside and outside are positions of the light probes.

The shadow volume may alternatively be obtained in a shadow volume manner, that is, a polyhedron is directly generated according to a shadow projected by the target object, and a volume block enclosing the polyhedron is used as a volume of the shadow.

3. Third stage: in a Unity engine, a position of the light probe is imported into the Unity engine and is written into a corresponding engine format (referred to as LightmapDataAsset in the Unity engine) by using script.

In this embodiment, two layers of light probes are provided for virtual things (such as mountains, trees, buildings, and the like) in the virtual scene, and two layers of light probes are also provided for virtual characters in the virtual scene. Finally, two types of light probes are integrated, and information file storing the light probes are modified and stored through code to obtain final position information of the light probes that may be used by the engine. Therefore, light rendering may be performed on the virtual things and the virtual characters in the virtual scene in a game process, to obtain an animation effect of global light.

In this embodiment, a Unity platform and a Houdini platform are used. However, the disclosure is not limited to the Unity platform and the Houdini platform, and any platform having light ray projection and voxelization functions may implement the solutions of this embodiment.

Figure 9:
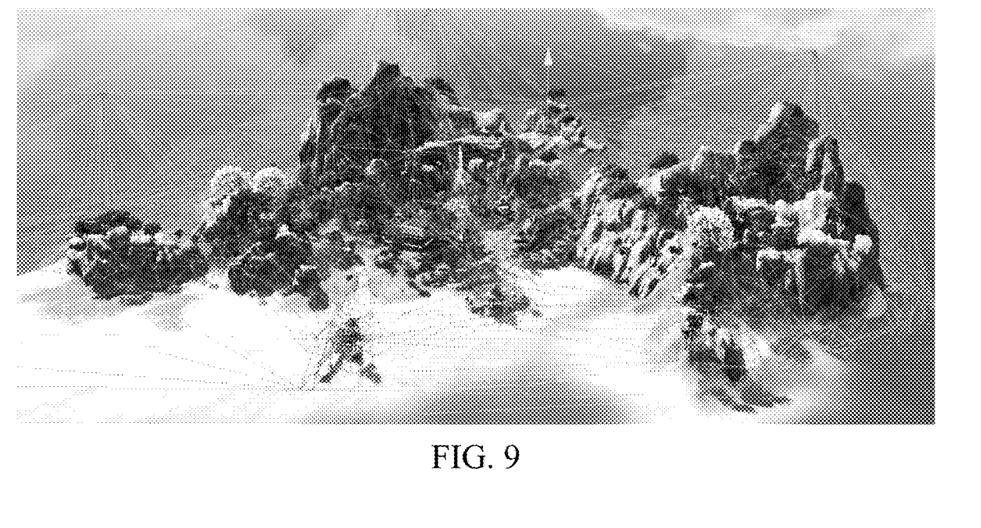
FIG. 9 is a schematic diagram of distributing a light probe in a virtual scene according to an embodiment.

As shown in FIG. 9, according to an example embodiment, distribution of the light probes is very organic, and the light probes are automatically placed according to local conditions. The overall distribution is on-demand, and the density shown in FIG. 9 is such that regions with more diversified scenes and more diversified light shadows may be distributed with more light probes, and empty regions may be distributed with few light probes.

When some pieces of color light information are required, a layer of lattice with a relatively large span may be superimposed finally. Spaces in the matrix may be artificially specified, and since color light information in an environment is generally extremely low frequency, the span may be large. In this case, based on the solutions of the embodiments of the disclosure, a sufficiently high global illumination effect may be achieved with the highest cost performance.

Based on the solutions provided in the example embodiments, the following beneficial effects may be obtained:

Time: it is time-saving to generate all of light probes, and manual display requires constant input, which generally may be one person/day per iteration of a scene.

Effect consistency: manual local operations are reduced, which may avoid inconsistent density and accuracy.

Memory saving: under the condition of the same precision, the memory occupied by the light probes in this solution is reduced by 9 times, which greatly saves the memory occupied by virtual scene images.

Through-wall optimization: the solutions in the example embodiments may make the distribution of light probes closer to the shadow boundary of the polygon than the conventional methods, and reduce the through-wall problem by 33% or more than the related art methods under the same accuracy condition, and reduce the through-wall effect by 80% on average than the related art methods under the same memory condition.

FIG. 2 is a schematic flowchart of a light probe generation method according to an embodiment. Although the operations in the flowchart of FIG. 2 are sequentially displayed in accordance with instructions of arrows, these operations are not necessarily performed sequentially in the order indicated by the arrows. Unless otherwise explicitly specified in this specification, execution of the operations is not limited, and the operations may be performed in other sequences. In addition, at least some operations in FIG. 2 may include a plurality of suboperations or a plurality of stages. The suboperations or the stages are not necessarily performed at the same moment, but may be performed at different moments. The suboperations or the stages are not necessarily performed in sequence, but may be performed in turn or alternately with another operation or at least some of suboperations or stages of the another operation.

Figure 10:
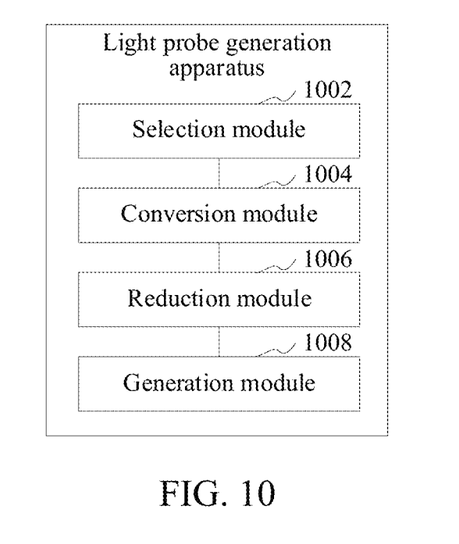
FIG. 10 is a structural block diagram of a light probe generation apparatus according to an embodiment.

As shown in FIG. 10, in an embodiment, a light probe generation apparatus is provided. The light probe generation apparatus specifically includes: a selection module 1002, a conversion module 1004, a reduction module 1006, and a generation module 1008.

The selection module 1002 is configured to select shadow points of a target object in a virtual scene.

The conversion module 1004 is configured to convert the selected shadow points into a voxelized shadow voxel object.

The reduction module 1006 is configured to reduce a quantity of vertexes in the shadow voxel object to obtain a shadow voxel object after the reduction.

The generation module 1008 is configured to generate a light probe at a vertex position of the shadow voxel object after the vertex reduction.

In an embodiment, the selection module 1002 is further configured to: generate a lattice in a bounding box of the virtual scene; and determine, when a light source projects a light ray from the bounding box to the virtual scene, that the light ray is intersected with points in the lattice and the light ray is intersected with the target object, and use the intersected points as the shadow points of the target object for extraction.

In an embodiment, the selection module 1002 is further configured to: control to emit, when the light source projects the light ray from the bounding box to the virtual scene, a ray in a direction of the light source by using the points in the lattice as reference points; and use, when the ray is intersected with all the target points in the target object, the target points and the corresponding reference points as the shadow points of the target object for extraction.

In an embodiment, the conversion module 1004 is further configured to: determine, when the light source projects the light ray from the bounding box to the virtual scene, a shadow region formed by a virtual object in the light ray; generate a polyhedron enclosing the shadow region; and convert the polyhedron enclosing the shadow region into a voxelized shadow voxel object.

In an embodiment, the conversion module 1004 is further configured to: obtain a first polyhedron; copy the first polyhedron to the shadow points to obtain corresponding shadow volumes; and perform voxelization on the shadow volumes to obtain the shadow voxel object.

In an embodiment, the conversion module 1004 is further configured to: generate a second polyhedron configured to enclose the selected shadow points; and perform voxelization on the second polyhedron to obtain the shadow voxel object.

In an embodiment, the reduction module 1006 is further configured to: combine at least two adjacent vertexes in the shadow voxel object; and/or smooth at least two adjacent planes in the shadow voxel object to reduce the quantity of the vertexes in the shadow voxel object.

In an embodiment, the generation module 1008 is further configured to: internally shrink the shadow voxel object after the vertex reduction to obtain an internally-shrunk shadow voxel object; and generate a light probe in the shadow at a vertex position of the internally-shrunk shadow voxel object.

In an embodiment, the generation module 1008 is further configured to: externally expand the shadow voxel object after the vertex reduction to obtain an externally-expanded shadow voxel object; and generate a light probe outside the shadow at a vertex position of the externally-expanded shadow voxel object.

Figure 11:
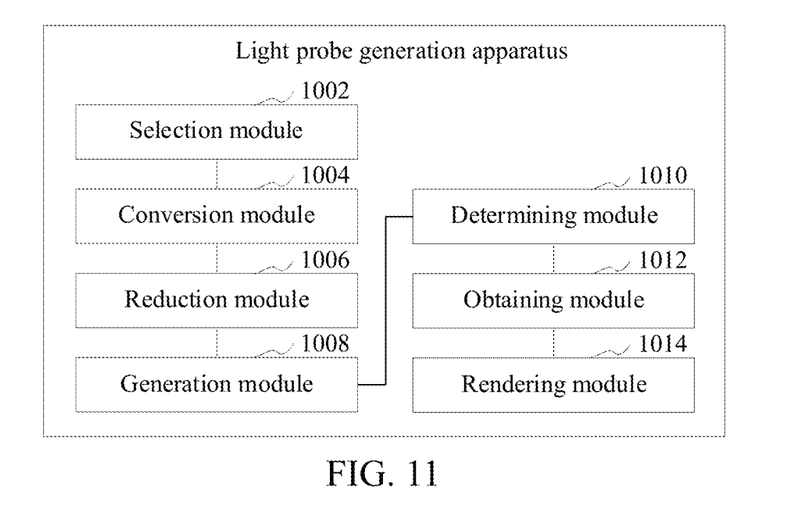
FIG. 11 is a structural block diagram of a light probe generation apparatus according to another embodiment.

In an embodiment, as shown in FIG. 11, the apparatus further includes: a determining module 1010, an obtaining module 1012, and a rendering module 1014.

The determining module 1010 is configured to determine a position of a dynamic object in a movement process.

The obtaining module 1012 is configured to obtain light information corresponding to the light probe according to the position.

The rendering module 1014 is configured to render the dynamic object according to the light information to obtain an animation effect of global light.

In the foregoing embodiment, shadow points of a target object in a virtual scene are selected, the selected shadow points are converted into a voxelized shadow voxel object; a quantity of vertexes in the shadow voxel object are reduced; and light probes are generated at vertex positions of the shadow voxel object after the vertex reduction. Therefore, the need to evenly distribute light probes in all regions in the virtual scene is avoided, and it is only required to distribute light probes for the target object, which reduces a quantity of distributed light probes. In addition, distribution positions of the light probes are determined by using vertexes of the shadow voxel object. Because the shadow voxel object may be formed by reducing vertexes of a plurality of regular polyhedrons, when the light probes are distributed at vertex positions of the shadow voxel object after the vertex reduction, the light probes may be distributed relatively evenly, avoiding a problem of inconsistent density. Moreover, before the light probes are generated, a quantity of light probes are further reduced by reducing a quantity of vertexes in the shadow voxel object.

Figure 12:
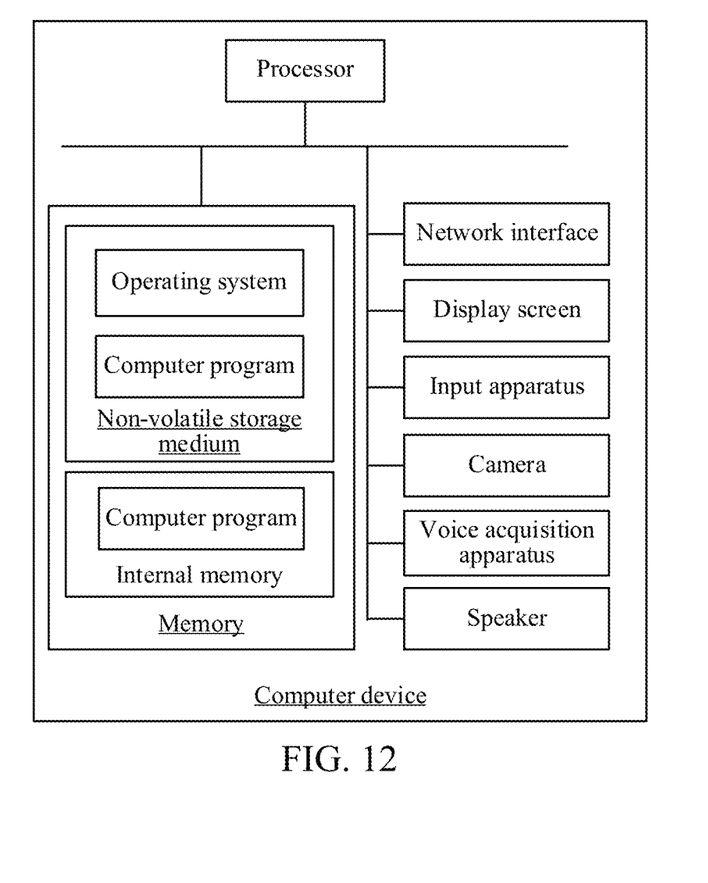
FIG. 12 is a structural block diagram of a computer device according to an embodiment.

FIG. 12 is a diagram of an internal structure of a computer device according to an embodiment. The computer device may be the terminal 110 or the server 120 in FIG. 1. An example in which the computer device is the terminal 110 is used for description. As shown in FIG. 12, the computer device includes a processor, a memory, a network interface, an input apparatus, and a display screen that are connected by a system bus. The memory includes a non-volatile storage medium and an internal memory. The non-volatile storage medium of the computer device stores an operating system and may further store a computer program, the computer program, when executed by the processor, causing the processor to implement the light probe generation method. The internal memory may also store a computer program, the computer program, when executed by the processor, causing the processor to perform the light probe generation method. The display screen of the computer device may be a liquid crystal display screen or an e-ink display screen. The input apparatus of the computer device may be a touch layer covering the display screen, or a button, a trackball, or a touchpad disposed on a housing of the computer device, or an external keyboard, touchpad, mouse, or the like.

A person skilled in the art would understand that, the structure shown in FIG. 12 is only a block diagram of a part of a structure related to a solution of the disclosure and does not limit the computer device to which the solution of the disclosure is applied. Specifically, the computer device may include more or fewer components than those in the drawings, or some components are combined, or a different component deployment is used.

In an embodiment, the light probe generation apparatus provided in the disclosure may be implemented in the form of a computer program. The computer program may be run on the computer device shown in FIG. 12. The memory of the computer device may store program modules forming the light probe generation apparatus, for example, the selection module 1002, the conversion module 1004, the reduction module 1006, and the generation module 1008 shown in FIG. 10. A computer program formed by the program modules causes the processor to perform the operations in the light probe generation method in the embodiments of the disclosure described in this specification.

For example, the computer device shown in FIG. 12 may perform operation S202 by using the selection module 1002 in the light probe generation apparatus shown in FIG. 10. The computer device may perform operation S204 by using the conversion module 1004. The computer device may perform operation S206 by using the reduction module 1006. The computer device may perform operation S208 by using the generation module 1008.

In an embodiment, a computer device is provided, including a memory and a processor, the memory storing a computer program, the computer program, when executed by the processor, causing the processor to perform the following operations: selecting shadow points of a target object in a virtual scene; converting the selected shadow points into a voxelized shadow voxel object; reducing a quantity of vertexes in the shadow voxel object to obtain a shadow voxel object after the reduction; and generating a light probe at a vertex position of the shadow voxel object after the vertex reduction.

In an embodiment, the computer program, when executed by the processor to perform the operation of selecting shadow points of a target object in a virtual scene, causes the processor to specifically perform the following operations: generating a lattice in a bounding box of the virtual scene; and determining, when a light source projects a light ray from the bounding box to the virtual scene, that the light ray is intersected with points in the lattice and the light ray is intersected with the target object, and using the intersected points as the shadow points of the target object for extraction.

In an embodiment, the computer program, when executed by the processor to perform the operation of selecting shadow points of a target object according to intersection points between the light ray and target points in the lattice and between the light ray and the target object, causes the processor to specifically perform the following operations: controlling to emit, by the terminal and when the light source projects the light ray from the bounding box to the virtual scene, a ray in a direction of the light source by using the points in the lattice as reference points; and using, when the ray is intersected with all the target points in the target object, the target points and the corresponding reference points as the shadow points of the target object for extraction.

In an embodiment, the computer program, when executed by the processor, causes the processor to perform the following operations: determining, when the light source projects the light ray from the bounding box to the virtual scene, a shadow region formed by a virtual object in the light ray; generating a polyhedron enclosing the shadow region; and converting the polyhedron enclosing the shadow region into a voxelized shadow voxel object.

In an embodiment, the computer program, when executed by the processor to perform the operation of converting the selected shadow points into a voxelized shadow voxel object, causes the processor to specifically perform the following operations: obtaining a first polyhedron; copying the first polyhedron to the shadow points to obtain corresponding shadow volumes; and performing voxelization on the shadow volumes to obtain the shadow voxel object.

In an embodiment, the computer program, when executed by the processor to perform the operation of converting the selected shadow points into a voxelized shadow voxel object, causes the processor to specifically perform the following operations: generating a second polyhedron configured to enclose the selected shadow points; and performing voxelization on the second polyhedron to obtain the shadow voxel object.

In an embodiment, the computer program, when executed by the processor to perform the operation of reducing a quantity of vertexes in the shadow voxel object, causes the processor to specifically perform at least one of the following operations: combining at least two adjacent vertexes in the shadow voxel object; and smoothing at least two adjacent planes in the shadow voxel object to reduce the quantity of the vertexes in the shadow voxel object.

In an embodiment, the computer program, when executed by the processor to perform the operation of generating a light probe at a vertex position of the shadow voxel object after the vertex reduction, causes the processor to specifically perform the following operations: internally shrinking the shadow voxel object after the vertex reduction to obtain an internally-shrunk shadow voxel object; and generating a light probe in the shadow at a vertex position of the internally-shrunk shadow voxel object.

In an embodiment, the computer program, when executed by the processor to perform the operation of generating a light probe at a vertex position of the shadow voxel object after the vertex reduction, causes the processor to specifically perform the following operations: externally expanding the shadow voxel object after the vertex reduction to obtain an externally-expanded shadow voxel object; and generating a light probe outside the shadow at a vertex position of the externally-expanded shadow voxel object.

In an embodiment, the target object includes a dynamic object. The computer program, when executed by the processor, causes the processor to further perform the following operations: determining a position of the dynamic object in a movement process; obtaining light information corresponding to the light probe according to the position; and rendering the dynamic object according to the light information to obtain an animation effect of global light.

In an embodiment, a computer-readable storage medium is provided, storing a computer program, the computer program, when executed by a processor, causing the processor to perform the following operations: selecting shadow points of a target object in a virtual scene; converting the selected shadow points into a voxelized shadow voxel object; reducing a quantity of vertexes in the shadow voxel object to obtain a shadow voxel object after the reduction; and generating a light probe at a vertex position of the shadow voxel object after the vertex reduction.

In an embodiment, the computer program, when executed by the processor to perform the operation of selecting shadow points of a target object in a virtual scene, causes the processor to specifically perform the following operations: generating a lattice in a bounding box of the virtual scene; and determining, when a light source projects a light ray from the bounding box to the virtual scene, that the light ray is intersected with points in the lattice and the light ray is intersected with the target object, and using the intersected points as the shadow points of the target object for extraction.

In an embodiment, the computer program, when executed by the processor to perform the operation of selecting shadow points of a target object according to intersection points between the light ray and target points in the lattice and between the light ray and the target object, causes the processor to specifically perform the following operations: controlling to emit, by the terminal and when the light source projects the light ray from the bounding box to the virtual scene, a ray in a direction of the light source by using the points in the lattice as reference points; and using, when the ray is intersected with all the target points in the target object, the target points and the corresponding reference points as the shadow points of the target object for extraction.

In an embodiment, the computer program, when executed by the processor, causes the processor to perform the following operations: determining, when the light source projects the light ray from the bounding box to the virtual scene, a shadow region formed by a virtual object in the light ray; generating a polyhedron enclosing the shadow region; and converting the polyhedron enclosing the shadow region into a voxelized shadow voxel object.

In an embodiment, the computer program, when executed by the processor to perform the operation of converting the selected shadow points into a voxelized shadow voxel object, causes the processor to specifically perform the following operations: obtaining a first polyhedron; copying the first polyhedron to the shadow points to obtain corresponding shadow volumes; and performing voxelization on the shadow volumes to obtain the shadow voxel object.

In an embodiment, the computer program, when executed by the processor to perform the operation of converting the selected shadow points into a voxelized shadow voxel object, causes the processor to specifically perform the following operations: generating a second polyhedron configured to enclose the selected shadow points; and performing voxelization on the second polyhedron to obtain the shadow voxel object.

In an embodiment, the computer program, when executed by the processor to perform the operation of reducing a quantity of vertexes in the shadow voxel object, causes the processor to specifically perform at least one of the following operations: combining at least two adjacent vertexes in the shadow voxel object; and smoothing at least two adjacent planes in the shadow voxel object to reduce the quantity of the vertexes in the shadow voxel object.

In an embodiment, the computer program, when executed by the processor to perform the operation of generating a light probe at a vertex position of the shadow voxel object after the vertex reduction, causes the processor to specifically perform the following operations: internally shrinking the shadow voxel object after the vertex reduction to obtain an internally-shrunk shadow voxel object; and generating a light probe in the shadow at a vertex position of the internally-shrunk shadow voxel object.

In an embodiment, the computer program, when executed by the processor to perform the operation of generating a light probe at a vertex position of the shadow voxel object after the vertex reduction, causes the processor to specifically perform the following operations: externally expanding the shadow voxel object after the vertex reduction to obtain an externally-expanded shadow voxel object; and generating a light probe outside the shadow at a vertex position of the externally-expanded shadow voxel object.

In an embodiment, the target object includes a dynamic object. The computer program, when executed by the processor, causes the processor to further perform the following operations: determining a position of the dynamic object in a movement process; obtaining light information corresponding to the light probe according to the position; and rendering the dynamic object according to the light information to obtain an animation effect of global light.

A person of ordinary skill in the art would understand that all or some of the processes of the methods in the foregoing embodiments may be implemented by a computer program instructing relevant hardware. The program may be stored in a non-volatile computer-readable storage medium. When the program is executed, the processes of the foregoing method embodiments are performed. References to the memory, the storage, the database, or other medium used in the embodiments provided in the disclosure may all include a non-volatile or a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

The technical features in the foregoing embodiments may be variously combined, replaced, and/or modified. For concise description, not all possible combinations of the technical features in the embodiments are described. However, provided that combinations of the technical features do not conflict with each other, the combinations of the technical features are considered as falling within the scope described in this specification.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments only show several implementations of the disclosure, and descriptions thereof are in detail, but are not to be understood as a limitation to the patent scope of the disclosure. A person of ordinary skill in the art may further make variations and improvements without departing from the ideas of the disclosure, which all fall within the protection scope of the disclosure. Therefore, the protection scope of the disclosure is subject to the protection scope of the appended claims.

What is claimed is:

1. A light probe generation method, performed by a computer device, the method comprising:
    selecting shadow points of a target object in a virtual scene;
    converting the selected shadow points into a voxelized shadow voxel object;
    reducing a quantity of vertexes in the voxelized shadow voxel object; and
    generating a light probe at a vertex position of a shadow voxel object obtained after vertex reduction and based on at least one of shrinking and expanding the shadow voxel object according to a proportion determined to fit the shadow voxel object to a surface of the shadow points of the target object.

2. The method according to claim 1, wherein the selecting the shadow points comprises:
    generating a lattice in a bounding box of the virtual scene; and
    determining, with respect to a light source that projects a light ray from the bounding box to the virtual scene, that the light ray is intersected with points in the lattice and the light ray is intersected with the target object, and selecting the intersected points as the shadow points of the target object.

3. The method according to claim 2, further comprising:
    emitting a ray in a direction of the light source by using the points in the lattice as reference points; and
    based on the ray being intersected with target points in the target object, selecting the target points and corresponding reference points as the shadow points of the target object.

4. The method according to claim 2, further comprising:
    determining a shadow region formed by a virtual object in the light ray;
    generating a polyhedron enclosing the shadow region; and
    the converting the selected shadow points comprises:
    converting the polyhedron enclosing the shadow region into the voxelized shadow voxel object.

5. The method according to claim 1, wherein the converting the selected shadow points comprises:
    copying a first polyhedron to the shadow points to obtain corresponding shadow volumes; and
    performing voxelization on the corresponding shadow volumes to obtain the voxelized shadow voxel object.

6. The method according to claim 1, wherein the converting the selected shadow points comprises:
    generating a second polyhedron configured to enclose the selected shadow points; and
    performing voxelization on the second polyhedron to obtain the voxelized shadow voxel object.

7. The method according to claim 1, wherein the reducing the quantity of vertexes comprises:
    combining at least two adjacent vertexes in the voxelized shadow voxel object; and/or
    smoothing at least two adjacent planes in the voxelized shadow voxel object to reduce the quantity of vertexes in the voxelized shadow voxel object.

8. The method according to claim 1, wherein the generating the light probe comprises:
    internally shrinking the shadow voxel object obtained after the vertex reduction to obtain an internally-shrunk shadow voxel object; and
    generating the light probe in a shadow at a vertex position of the internally-shrunk shadow voxel object.

9. The method according to claim 1, wherein the generating the light probe comprises:
    externally expanding the shadow voxel object obtained after the vertex reduction to obtain an externally-expanded shadow voxel object; and
    generating the light probe outside a shadow at a vertex position of the externally-expanded shadow voxel object.

10. The method according to claim 1, wherein the generating the light probe comprises:
    internally shrinking the shadow voxel object obtained after the vertex reduction to obtain an internally-shrunk shadow voxel object;
    externally expanding the shadow voxel object obtained after the vertex reduction to obtain an externally-expanded shadow voxel object; and
    generating light probes at a vertex position of the internally-shrunk shadow voxel object and a vertex position corresponding to the externally-expanded shadow voxel object.

11. The method according to claim 1, wherein the target object includes a dynamic object; and the method further comprises:
    determining a position of the dynamic object in a movement process;
    obtaining light information corresponding to the light probe according to the position; and
    rendering the dynamic object according to the light information to obtain an animation effect of global light.

12. A light probe generation apparatus, comprising:
    at least one memory configured to store program code; and
    at least one processor configured to read the program code and operate as instructed by the program code, the program code comprising:
        selection code configured to cause the at least one processor to select shadow points of a target object in a virtual scene;
        conversion code configured to cause the at least one processor to convert the selected shadow points into a voxelized shadow voxel object;

reduction code configured to cause the at least one processor to reduce a quantity of vertexes in the voxelized shadow voxel object; and generation code configured to cause the at least one processor to generate a light probe at a vertex position of a shadow voxel object obtained after vertex reduction and based on at least one of shrinking and expanding the shadow voxel object according to a proportion determined to fit the shadow voxel object to a surface of the shadow points of the target object.

13. The apparatus according to claim 12, wherein the selection code comprises:

generation sub-code configured to cause the at least one processor to generate a lattice in a bounding box of the virtual scene; and determination sub-code configured to cause the at least one processor to determine, with respect to a light source that projects a light ray from the bounding box to the virtual scene, that the light ray is intersected with points in the lattice and the light ray is intersected with the target object, and select the intersected points as the shadow points of the target object.

14. The apparatus according to claim 13, wherein the selection code further comprises:

emission sub-code configured to cause the at least one processor to emit a ray in a direction of the light source by using the points in the lattice as reference points; and based on the ray being intersected with target points in the target object, selecting the target points and corresponding reference points as the shadow points of the target object.

15. The apparatus according to claim 13, wherein the conversion code is configured to cause the at least one processor to:

determine a shadow region formed by a virtual object in the light ray;

generate a polyhedron enclosing the shadow region; and convert the polyhedron enclosing the shadow region into the voxelized shadow voxel object.

16. The apparatus according to claim 12, wherein the conversion code is configured to cause the at least one processor to: copy a first polyhedron to the shadow points to obtain corresponding shadow volumes; and perform voxelization on the corresponding shadow volumes to obtain the voxelized shadow voxel object.

17. The apparatus according to claim 12, wherein the conversion code is configured to cause the at least one processor to: generate a second polyhedron configured to enclose the selected shadow points; and perform voxelization on the second polyhedron to obtain the voxelized shadow voxel object.

18. The apparatus according to claim 12, wherein the reduction code is further configured to cause the at least one processor to:

combine at least two adjacent vertexes in the voxelized shadow voxel object; and/or smooth at least two adjacent planes in the voxelized shadow voxel object to reduce the quantity of vertexes in the voxelized shadow voxel object.

19. A non-transitory computer-readable storage medium, storing a computer program executable by at least one processor to perform a light probe generation method, the method comprising:

selecting shadow points of a target object in a virtual scene;

converting the selected shadow points into a voxelized shadow voxel object;

reducing a quantity of vertexes in the voxelized shadow voxel object; and generating a light probe at a vertex position of a shadow voxel object obtained after vertex reduction and based on at least one of shrinking and expanding the shadow voxel object according to a proportion determined to fit the shadow voxel object to a surface of the shadow points of the target object.

20. A computer device, comprising a memory and a processor, the memory storing a computer program, the computer program, when executed by the processor, causing the processor to perform operations of the method according to claim 1.

* * * * *